United States Patent

[11] 3,604,419

| [72] | Inventors | Mordechai Haim Diskin<br>Haifa;<br>Amnon David, Tel Aviv; Alexander Vilensky, Haifa, all of, Israel |
|---|---|---|
| [21] | Appl. No | 760,887 |
| [22] | Filed | Sept. 19, 1968 |
| [45] | Patented | Sept. 14, 1971 |
| [73] | Assignee | Technion Research & Development Foundation, Ltd. |
| [32] | Priority | Aug. 13, 1968 |
| [33] | | Israel |
| [31] | | 30,550 |
| | | Continuation-in-part of application Ser. No. 588,643, Oct. 5, 1966, now Patent No. 3,481,334. |

[54] APPARATUS FOR URINARY BLADDER TREATMENT
1 Claim, 4 Drawing Figs.

[52] U.S. Cl. ................................................. 128/227,
128/213, 128/DIG. 13, 137/486, 222/55, 222/56
[51] Int. Cl. ............................................. A61m 3/00
[50] Field of Search .......................................... 128/172,
213, 214, 227, 239–241, 248, 251, DIG. 13;
137/486, 487.5; 222/55, 56, 59

[56] References Cited
UNITED STATES PATENTS

| 2,509,295 | 5/1950 | Glass | 137/487.5 X |
| 3,185,153 | 5/1965 | Leucci | 128/227 |
| 3,344,805 | 10/1967 | Wapner | 137/486 |
| 3,450,153 | 6/1969 | Hildebrandt et al. | 137/486 |

FOREIGN PATENTS

| 30,234 | 7/1964 | East Germany | 128/DIG. 13 |
| 432,730 | 9/1967 | Switzerland | 128/DIG. 13 |

OTHER REFERENCES

" Pulse Counter Flow Controller" by R. J. Masterson, IBM TechnicaL Disclosure Bulletin, Vol. 7, No. 11, April 1965 pages 1028 and 1029. Copy in 137–486.

*Primary Examiner*—Richard A. Gaudet
*Assistant Examiner*—Ronald L. Frinks
*Attorneys*—Bierman & Bierman, Harry C. Bierman and Jordan B. Bierman ABSTRACT: A device for maintaining a constant flow of irrigating fluid through the bladder comprising a flow detector which generates an output signal as a function of the flow rate, a rate meter with its input connected to the output of the detector and which produces an electrical signal whose magnitude is proportional to the flow rate, a servomechanism with its input connected to the output of the rate meter, the mechanism producing output corresponding to the signal at its input, and a flow regulator in the hydraulic line supplying fluid to the detector which is controlled by the output of the mechanism.

APPARATUS FOR URINARY BLADDER TREATMENT

The present application is a continuation-in-part of application Ser. No. 588,643, filed Oct. 5, 1966 now U.S. Pat. No. 3,481,334 in the names of Mordechai Diskin and Amnon David.

This invention deals with a device used to accurately control the volume and/or rate of flow of fluid into a urinary bladder in combination with a control circuit for automatically changing both volume and rate of flow of fluid into the urinary bladder according to the requirements of the phases known respectively as inflation and irrigation.

The prior art devices provide certain problems which can result in serious difficulties. In one such device the hydrostatic head available for driving the fluid through the bladder as well as through the rest of the system becomes smaller as the bottle containing the fluid empties. Moreover, the patient may change his position and thereby vary the pressure head. Finally, the resistance of other parts of the system (tubing, valves, etc.) to the flow of fluid will affect the rate of flow. It is among the object of this invention to provide devices for inflation and irrigation of the bladder wherein accurate control of the volume and rate of flow can be obtained.

It is also among the objects of this invention to provide such a device which is operable by means of a simple gravity flow.

In those embodiments of the prior art employing a pump to circulate the irrigating fluid, it is possible to build up high pressures in the bladder by accident, which pressures are dangerous to the patient. In the present invention, the maximal pressure available is only that of the hydrostatic head of the supply bottle above the patient since gravity feed is employed.

In the present invention, the volume of irrigation fluid into the bladder can be selected over a wide range, for example in steps of 10 cc. from 10 cc. to 990 cc., and the rate of flow can be adjusted from about 1.5 cc. per min. to 15.0 cc. per min. These parameters can be chosen quickly and conveniently from the precalibrated apparatus of the invention without having to refer to stop watches, or without having to make any calibrations; which is not the case with the previous invention referred to.

Another advantage of the present invention is that its operation is quiet. It makes use of no pumps, and the only moving parts are those of the servomotor and the variable clamp, which are in operation only for a small fraction of the time; i.e., they have a low duty cycle. In the previous invention referred to, for those embodiments in which a pump is used, the noise of the constantly rotating pump and motor tend to be a source of annoyance.

In practice it has been found that the present invention, because it is based upon electronic circuits for measurement and control, makes it easy to arrange for an alarm circuit to be added so that an alarm is given, when for any reason, there is a stoppage of fluid flow, or when flow rate drops considerably. The electronic circuits permit the various functions to be selected with speed and convenience.

The invention is illustrated both schematically, and in practical embodiments in the accompanying drawings in which.

Figure 1:
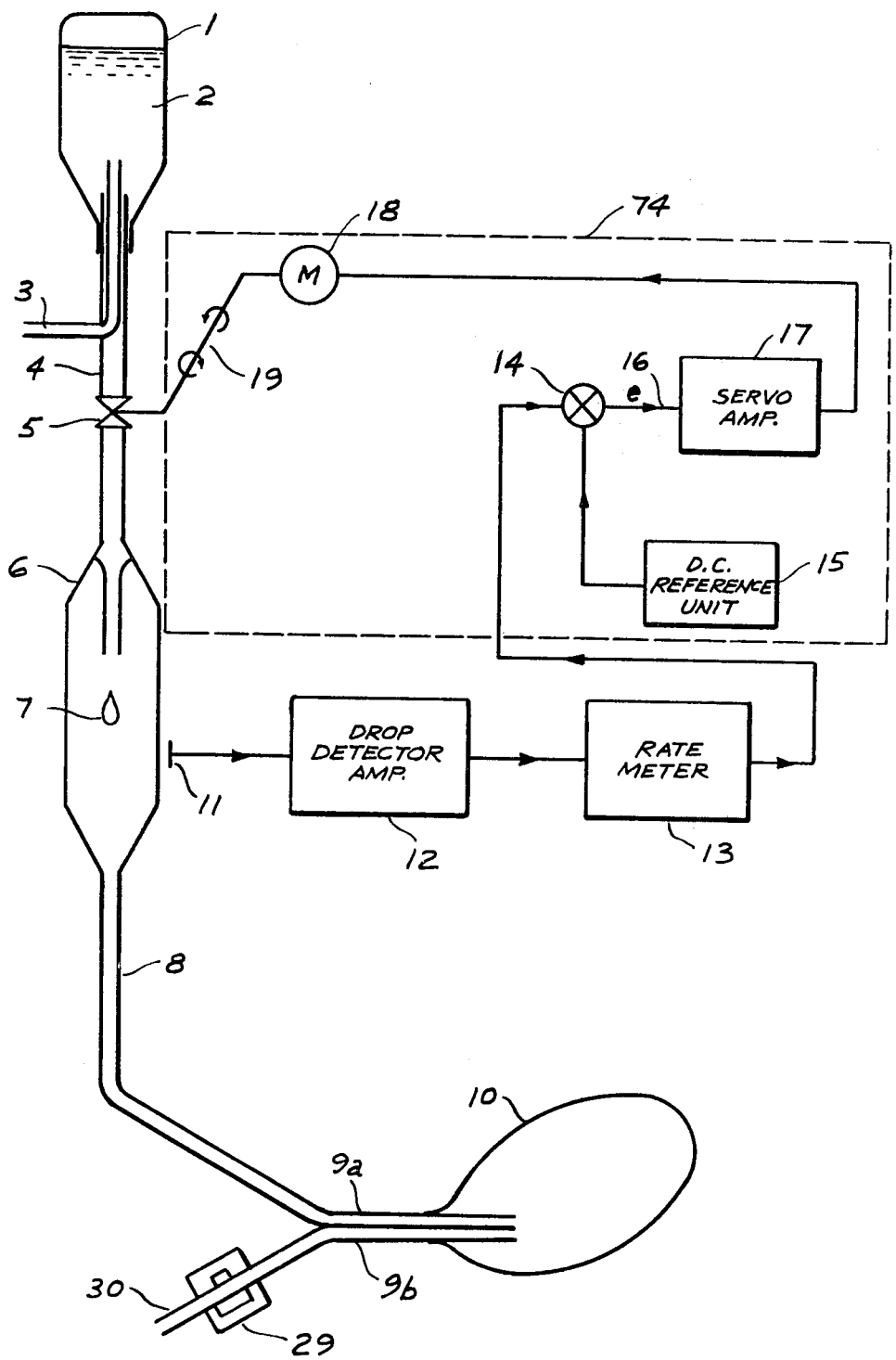
FIG. 1 is a schematic drawing showing the various elements of the flow rate control unit of the apparatus of the invention.

The operation of the flow rate unit will be described by reference to the schematic drawing of FIG. 1 where a container 1, is used for holding the irrigating fluid, 2. An air vent, 3, is provided to permit atmospheric air to enter the container in order that atmospheric pressure may act on the irrigating fluid permitting it to flow into the feed line, 4. Control over the flow rate of the irrigating fluid is obtained through the use of automatically adjustable valve, 5, the fluid output from which is fed into drop chamber, 6, wherein uniformly sized drops, 7, are formed. The fluid output from the drop chamber is directed through tubing 8, to the inlet tube, 9a, of a catheter and the fluid flows through this inlet into the bladder 10. Fluid drains from the bladder when necessary through the outlet tube, 9b, of the catheter.

Accurate flow rate control is maintained through the use of a closed loop servomechanism 74 (containing the elements, 14 to 19) and the adjustable valve, 5, which act as follows: The fall of each drop is detected by drop detector, 11, whose output is amplified by the drop detector amplifier, 12, the output of which amplifier is fed into the rate meter, 13. The DC signal from the ratemeter is fed into a DC comparator, 14, where it is compared with the voltage from the DC reference unit, 15, and an error signal, 16, is produced. This error signal (shown as "e" on the diagram) is fed into servoamplifier, 17. The amplifier error signal then drives the bidirectional motor, 18. The motor drive shaft is connected through a suitable mechanical transmission, 19, to the adjustable valve, 5, which is then controlled automatically so that the desired flow rate is maintained according to well-known servomechanism action.

Operation of the cycle control unit will be described by reference to FIG. 2, where the output signal from a flow transducer, 20, is fed into flow detector and amplifier, 21. This "flow transducer" may be, for example, the combination of the drop chamber, 6, and drop detector, 11, of FIG. 1, or, the flow transducer could be any one of many available types of transducers for metering flow of liquids. The output of the flow detector and amplifier, 21, is in the form of pulses, 22, and is fed into either irrigation volume counter, 24, or inflation volume counter, 25, depending upon the position of changeover switch, 23. At the end of a predetermined number of pulses into the counter in operation (for example, through a conventional preset circuit), a pulse is produced to flip the bistable circuit 26 from one to the other of its two states. In changing its state, the bistable circuit produces a change in DC level in the line, 27, so that the changeover switch, 23, is changed from one to the other of its two states; i.e., pulses, 22, are directed from one of the counters to the other. At the same time, the action of the bistable circuit is used either to open the output valve, 29, (corresponding to the "irrigation" phase), or to close it (corresponding to the "inflation" phase), as the case may be. This cycle, (though described once) can be made to operate continuously.

Figure 3:
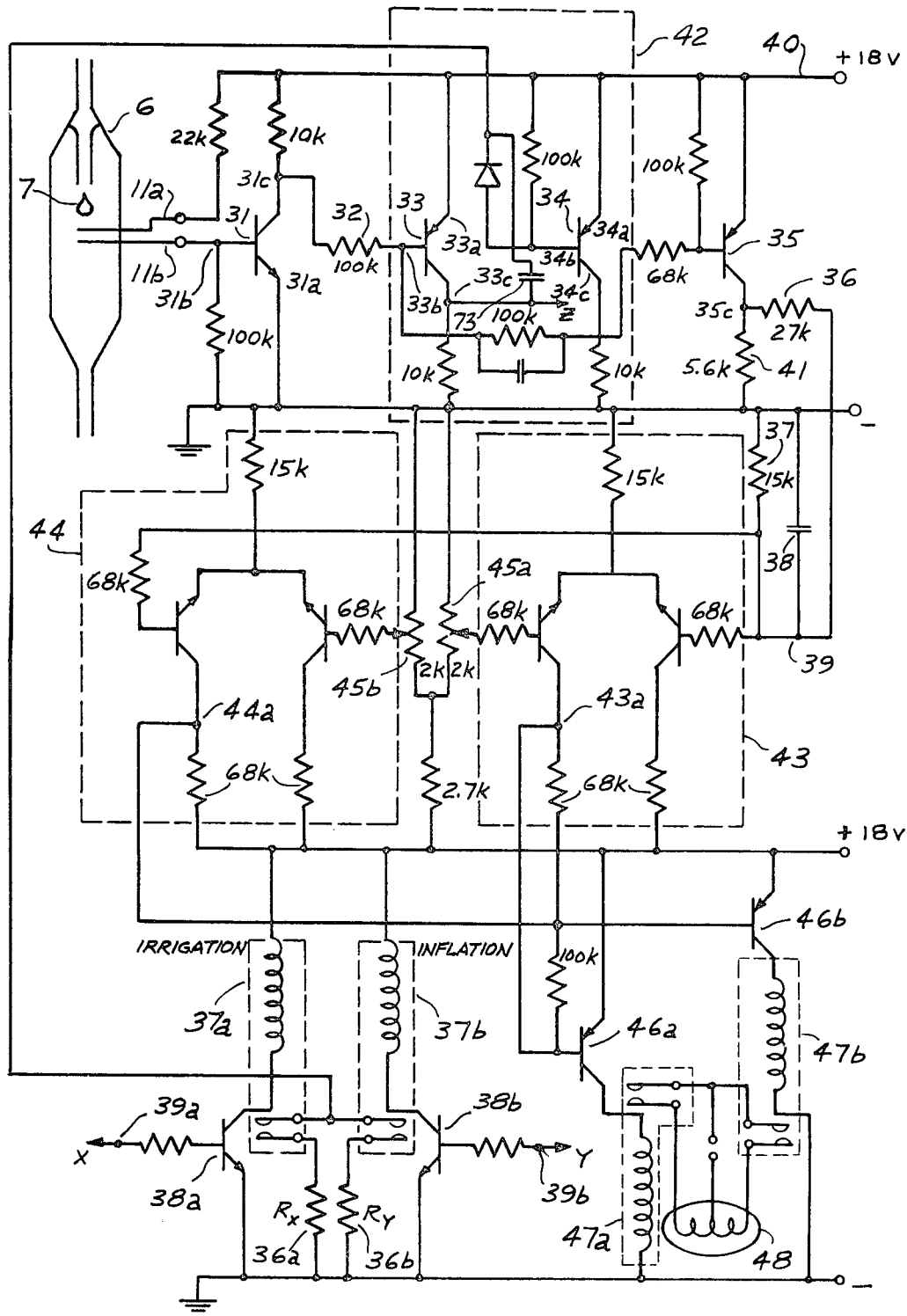
FIG. 3 is a circuit diagram of an embodiment of the flow rate control unit of the apparatus of the invention; and, FIG. 4 is a circuit diagram of an embodiment of the volume and mode control unit of the apparatus of the invention.

Given in FIG. 3 is an embodiment of the flow control unit whose schematic diagram is shown in FIG. 1. The circuit to be described through the use of FIG. 3 is given by way of example only, and represents only one of a multitudinous number of ways for performing the functions of controlling rate of flow of the irrigating fluid. Referring to FIG. 3; the drop of falling irrigating fluid, 7, falls onto electrodes, 11a, and 11b, in the drop chamber, 6. By making contact with both electrodes at the same time, the resistance between the electrodes, 11a, and 11b, is changed considerably. As a result, transistor, 31, saturates and the voltage at the collector, 31c, is reduced almost to ground potential. Current then flows through resistor, 32, to the base, 33b, of transistor, 33. It is noted here that transistors, 33, and 34, comprise, along with their other circuit parts, an astable univibrator circuit, 42, which circuit is well known in the art, and the operation of which is described in the literature on this subject. The output voltage of this circuit is taken at junction, 34c. Due to the current flow to base, 33b, of transistor, 33, the voltage at the output junction, 34c, drops for a predetermined period of time depending upon the parameters of the univibrator circuit, 42. After the passage of this time, during which the potential at the output junction, 34c, drops, the circuit reestablishes itself, and the potential rises once again. The two circuit elements having the greatest effect upon the length of time during which the voltage at junction, 34c, remains depressed are the capacitor, 73, and the resistors, 36a, or 36b, as the case may be. The choice of either, 36a, or, 36b, is made by actuating relay, 37a, or 37b.

The relays are actuated by their corresponding transistors, 38a, or 38b the operation of which is carried out at junctions, 39a, or 39b. By the choice of either resistor, 36a, or 36b, the time constant of the univibrator circuit, 42, can be made either relatively long or short. When the potential at the junction, 34c, drops, transistor, 35, saturates and the voltage at the junction, 35c, approaches the value of the supply voltage, 40. Thus, capacitor, 38, is charged through resistor, 36. When the voltage at junction, 34c, is restored, transistor, 35, cuts off, and the charge of capacitor, 38, is allowed to discharge mainly through resistor, 37, and resistors, 36, and 41. In the case where drops, 7, fall continuously, one after the other, the univibrator mentioned previously will produce a train of square wave pulses, and a result, a DC potential will be produced at junction, 39, which potential will contain a small pulsating component. The magnitude of the average DC potential thus produced will be directly proportional to the rate of fall of the drops, 7. The magnitude of this potential (for a given rate of fall of drops) is also inversely proportional to the value of the resistances, 36a, and 36b.

To perform the function of the DC comparator, 14, of FIG. 1, two differential amplifiers, 43, and 44, are used. One input for each amplifier is obtained from the corresponding potentiometer circuits, 45a, and 45b. If the voltage at junction, 39, is lower than a certain predetermined "low," value, then the voltage at the output, 43a, of the differential amplifier will be less than the supply voltage, 40, and therefore, transistor, 46a, operates the relay, 47a, which causes the two-phase motor, 18, of FIG. 1 to rotate in a direction so that valve, 5, of FIG. 1 is opened, and this acts to increase the rate of fall of the drops, 7. On the other hand, if the voltage at junction 39, is higher than a certain predetermined "high" value, then the voltage at junction, 44a, will be lower than the supply voltage, 40, and transistor, 46b, will actuate relay, 47b, which causes the motor, 18, to rotate in a direction so that valve, 5, is closed, and this acts to decrease the rate of fall of the drops, 7. When the rate of fall of the drops is between the two desired "low" and "high" limits, then the voltage at junction, 39, will be somewhere between the predetermined "low" and "high" values as explained previously. In this state, neither relays, 47a, nor, 47b, will be actuated and the motor will be, therefore, in a quiescent state; that is, it will not be rotating.

Thus, if the time constant of the univibrator circuit, 42, is made relatively long, by choosing a large value for resistor, 36a, or 36b, then the voltage appearing at junction, 39, will be relatively high. The total effect of this, through the servomechanism action, is to reduce the rate of fall of the drops, 7. Conversely, a short time constant increases the rate of fall of the drops through the servomechanism circuit action.

Figure 2:
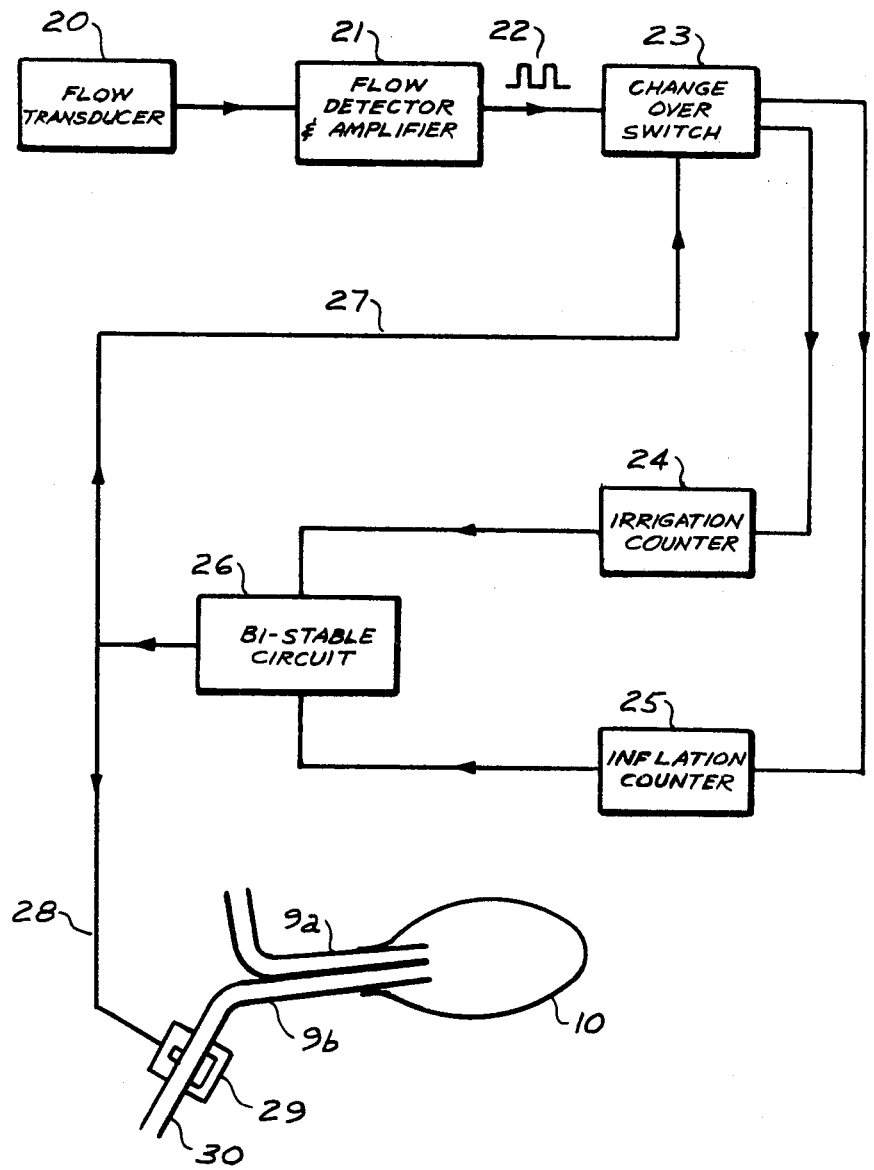
FIG. 2 is a schematic drawing showing the various elements of the volume and mode control unit of the apparatus of the invention.
Figure 4:
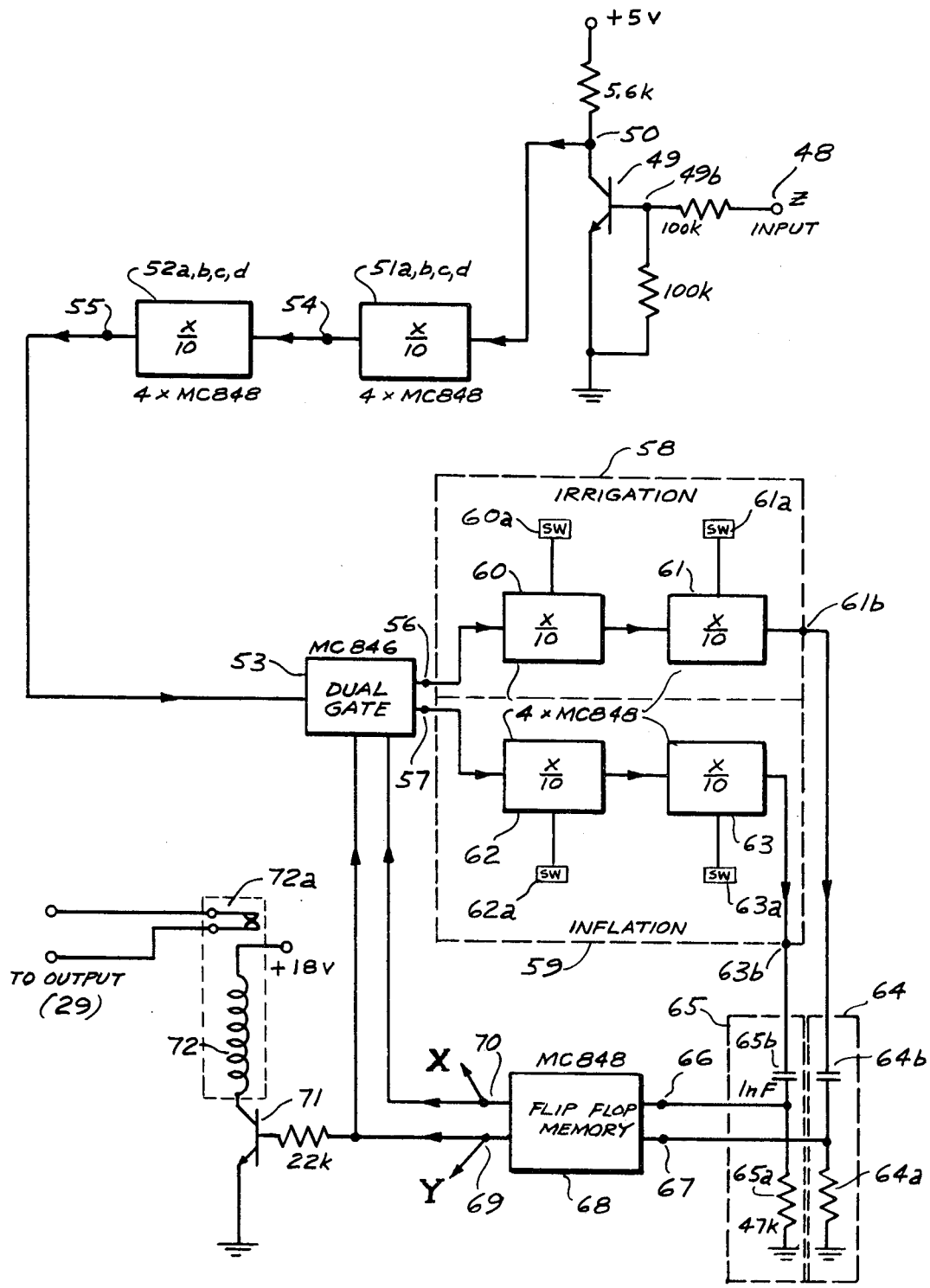

In FIG. 4 is a circuit diagram of an embodiment of the volume and mode control unit whose schematic diagram is shown in FIG. 2. The circuit to be described through the use of FIG. 4 is given by way of example only, and this embodiment represents one of a number of ways for performing the function of controlling the volume output and mode of operation of the bladder-irrigating device of the invention.

Operation of the volume and mode control unit of the apparatus of the invention is as follows: The drop chamber, 6, is designed so as to produce drops, 7, of uniform size (and volume). For example, in a common case, the drops, 7, are 0.1 cc. As described previously, an electrical pulse is produced for each falling drop, and this pulse appears at terminal Z, 48, (see FIG. 3), and it is this pulse that is taken as the input to the volume and mode control unit at the corresponding terminal Z, 48, of FIG. 4. The signal is applied to base, 49b, of transistor, 49, and appears as a negative pulse at connection point, 50. This pulse is fed into a divider-by-ten circuit, 51, composed of four integrated microelectronic binary logic circuits, 51a, 51b, 51c, and 51d. In this case, and by way of example, commercially available units made by the Motorola Corp. were used, having catalog number MC848. Four such units were connected together so that for every 10 pulses appearing at the input, 50, one pulse will appear at connection point, 54.

A similar divider-by-ten stage, 52, is provided so that for every 10 pulses appearing at point, 54, one pulse appears at point, 55. The point, 55, is also the input to a dual gate unit, 53, a single Motorola unit, catalog number MC846, which is here used as a dual gate. According to the mode of operation at any given time, the output of the dual gate unit, 53, is applied to either connection point, 56, or, 57. When the dual gate unit feeds point, 56, then the signal is applied to the irrigation counter, 58. This counter includes two decades, 60, and 61, that are presettable to a desired number of means of preset switches, 60a, and 61a, respectively. (The counter units, 60, and 61, are made up of MC848 units having in addition a preset switch connected to each unit). The preset switch permits selection of any integer from zero to nine. When the selected and preset value is obtained by both counters, 60, and 61, a pulse appears at point, 61b, at the output of the preset counter. The combination of resistor, 64a, and capacitor, 64b, constitutes an RC circuit for differentiating the pulse from the counter output, 61b. The differentiated pulse takes the form of a spike which is applied to input terminal, 67 of flip-flop memory circuit, 68. Note here, that to serve the function of a flip-flop memory circuit, the same basic MC848 Motorola binary unit is used. The spike has the effect of changing the position of the flip-flop circuit from one to the other of its two stable positions, so that, with a spike applied at point, 67, terminal Y, 69, will have a high potential, and terminal X, 70, will have a low potential. With terminal Y, 69, flipping to high potential, the dual gate, 53, switches from its output connection, 56, to output connection, 57, and then transistor, 71, goes from its cutoff operation to operation at saturation, which actuates relay 72, closing contacts, 72a, which closure permits application of power to the output valve, 29, of FIG. 2.

An identical series of events occurs with the drop-counting signals appearing at connection point, 57, at the output of the dual gate. In this case a different volume is preset into counters, 62, and 63, and the output signal for the inflation counter, 59, is obtained at connection point 66, after passing through differentiation, 65a, and 65b. The spike produced at the end of the inflation mode actuates the flip-flop memory circuit, 68 so that it reverses the potential at the output so that terminal, 70, becomes high in potential, and terminal, 69, becomes low in potential. As a result, the dual gate, 53, now begins the counting process, once again, through the irrigation counter, 58, and the transistor, 71, cuts off so that relay, 72, is deenergized, contacts, 72a, are opened, and finally, the output valve, 29 (FIG. 2) is opened also.

The above-described cycle of events will operate automatically and indefinitely to give definite volumes of irrigating fluid for each of the irrigation and inflation modes of the bladder irrigation.

This invention has been described in terms of specific embodiments set forth in detail, but it should be understood that these are by way of illustration only and that the invention is not necessarily limited thereto. Alternative constructions will become apparent to those skilled in the art in view of this disclosure, and accordingly, modifications of the apparatus disclosed herein are to be contemplated within the spirit of this invention.

Having now particularly described and ascertained the nature of our said invention and in what manner the same is to be performed, we declare that what we claim is:

1. A device for urinary bladder treatment for maintaining a constant flow of irrigating fluid through the bladder comprising, in combination:

A. a hydraulic line for permitting flow of fluid from a fluid source to the bladder, a catheter adapted for insertion into said bladder, said catheter having an inlet in fluid communication with said hydraulic line and an outlet for permitting fluid into said bladder, and discharge outlet means on said catheter having a valve for permitting the controlled removal of fluid from said bladder;

B. a bladder fluid flow detector connected to said hydraulic line which generates an output signal as a function of the rate of flow of fluid passing through the said detector;
C. a rate meter, whose input is connected to the output of the flow detector which rate meter produces an electrical signal whose magnitude is proportional to the rate of flow of fluid passing through the fluid flow detector;
D. a servomechanism apparatus, whose input is connected to the output of the rate meter, and which servomechanism produces an output in accordance with the electrical signal at its input;
E. a flow-regulating means connected in the hydraulic line supplying irrigating fluid to the fluid flow detector, which flow-regulating means is controlled by the output of the servomechanism apparatus;
F. a volume and mode control unit comprising:
G. an electrically actuated changeover switch which receives pulses at its input from the fluid flow detector;
H. a counter for counting pulses whose input is connected to the output of the changeover switch when the bladder treatment device is operating in its irrigation mode;
I. a second counter for counting pulses, whose input is connected to the output of the changeover switch when the bladder treatment device is operating in its inflation mode;
J. a bistable circuit, having one of its inputs connected to the output of the irrigation counter, and the other of its inputs connected to the inflation counter, and the output of which bistable circuit is connected to said valve for controlling the flow of urinary fluid out of the bladder being treated such that in the inflation mode of operation the valve is closed, and in the irrigation mode of operation of the valve is opened.